March 24, 1953  M. R. PLACENTINO  2,632,492
PNEUMATIC VEHICLE TIRE INNER TUBE
Filed June 7, 1949  2 SHEETS—SHEET 1
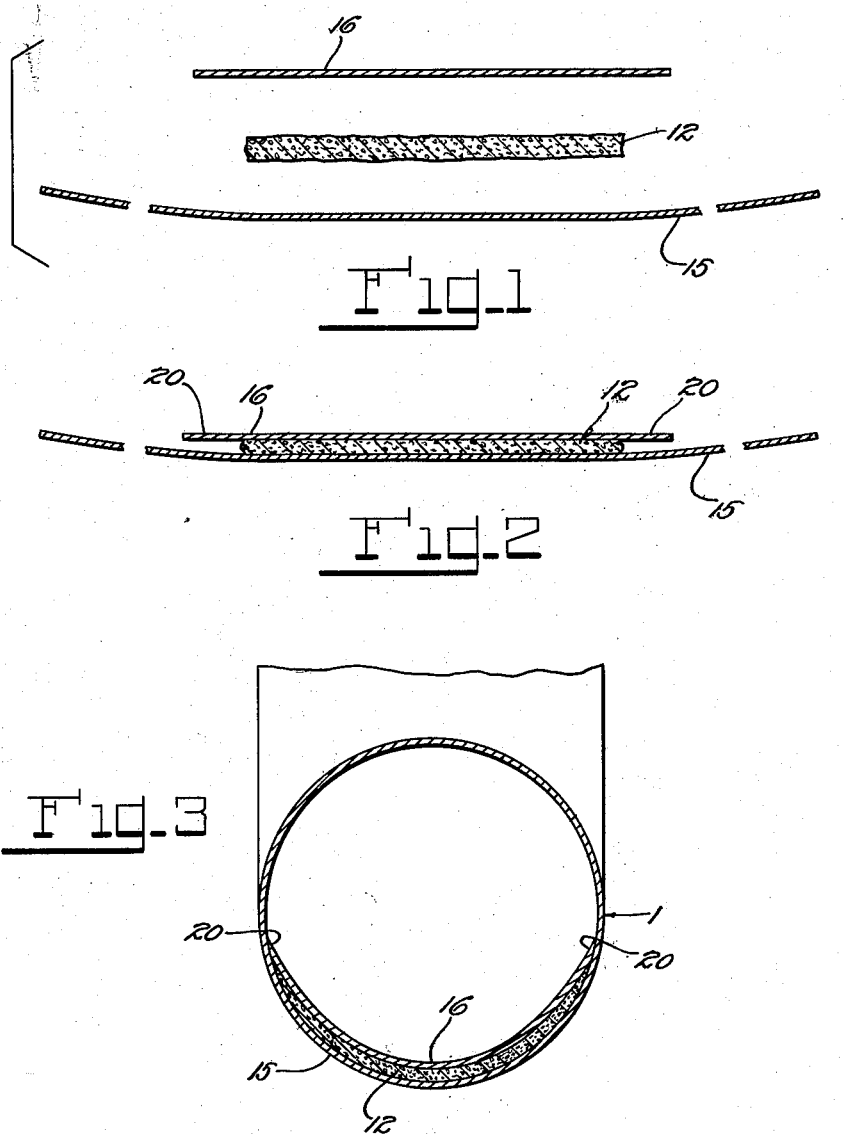

March 24, 1953  M. R. PLACENTINO  2,632,492
PNEUMATIC VEHICLE TIRE INNER TUBE

Filed June 7, 1949  2 SHEETS—SHEET 2

INVENTOR:
Michael R. Placentino
by Dike, Calvert Porter
Attys.

Patented Mar. 24, 1953

2,632,492

UNITED STATES PATENT OFFICE 2,632,492

PNEUMATIC VEHICLE TIRE INNER TUBE

Michael R. Placentino, Worcester, Mass.

Application June 7, 1949, Serial No. 97,569

3 Claims. (Cl. 152—347)

This invention relates to pneumatic vehicle tire inner tubes and more particularly to a self-sealing tube and method of fabrication.

The principal object of the invention is to provide a self-sealing tire inner tube and a method of making it in which the tube retains its pressure when punctured whether the foreign body causing the puncture is left imbedded in the tube or removed therefrom.

Essentially, my invention comprises a tube structure including an inner core of coarse rubber sponge impregnated with a composition which is tacky and adhesive after vulcanization, the core being enclosed between double walls of the usual tube material in the part of the tube desired to be self-sealing, usually the outer peripheral part adjacent the tread. The example shown and described is purely illustrative and is not limiting, particularly with respect to the impregnating composition, and variations in the ingredients and their proportions and method of treatment and incorporation in my novel inner tube structure may be made without departing from the scope of the invention.

In the drawings:

Fig. 1 is an exploded cross section end view of the parts of the tube structure;

Fig. 2 is a view similar to Fig. 1 with the parts partly brought together;

Fig. 3 is a cross section end view of the completed tube of the invention;

Figure 4:
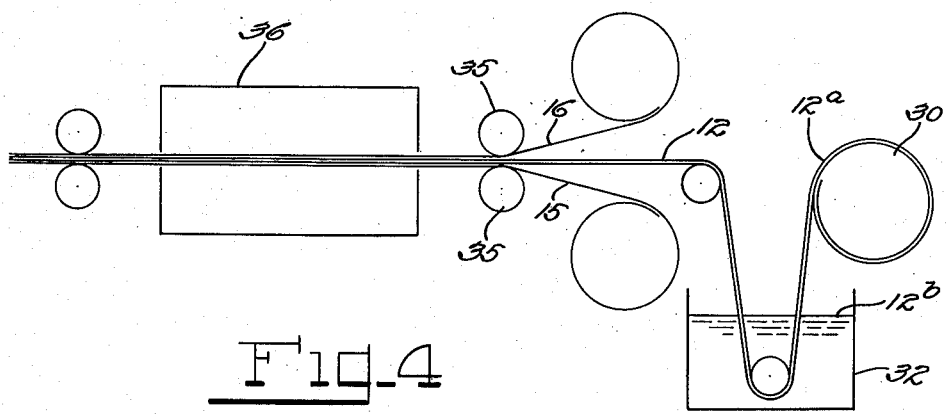
Fig. 4 is a view illustrating one method of making the tube.

In the drawings Figs. 1 to 3 show the finished tube structure indicated at 1 and its structural parts and their relative position. These comprise the outer tube part 15, the self-sealing member 12, and an inner covering member 16 to secure the self-sealing member 12 to the inside of the tube member 15. I am aware that a number of self-sealing tubes have been made having general structure similar to that shown in Fig. 3 but only to the extent that a self-sealing element has been placed in the tube structure against the outer peripheral part of the tube adjacent the tread and secured by a covering piece.

Such tubes have been unsatisfactory because if the so-called self-sealing element was strong enough to retain its shape and position in the tube, it did not have satisfactory self-sealing characteristics. On the other hand, if this element was soft and tacky and adhesive enough to have adequate self-sealing properties, it tended to squeeze and drift out of shape under conditions of use and throw the tire out of balance. Thin spots appeared in the area in contact with the ground and thick spots occurred in undesirable places. Furthermore, I have found that if the desirable characteristics of self-sealing and retention of shape are achieved, the tire tube was undesirably heavy or else it could not be satisfactorily folded and transported or else the structure was such that unless air was kept in the tube all the time, the walls of the tube would stick together and the tube was therefore ruined. I have now provided a self-sealing inner tube for pneumatic tires which has none of the above disadvantages and which is light in weight and can be deflated and compactly folded for transportation and which retains its predetermined shape, and at the same time has adequate self-sealing characteristics under hard conditions of use.

Furthermore, I have provided a method of assembling my novel self-sealing member in the structure of the inner tube in a continuous automatic operation which does not require expensive equipment beyond the equipment of the usual tire shop and which can therefore be made inexpensively, the component parts also being inexpensive.

Accordingly, I provide coarse rubber sponge 12a which is porous and has properties of deformability and liquid absorption. The sponge 12a may be approximately ⅜" thick and of a width necessary to cover that portion of a tube which it is desired to be self-sealing, and I impregnate the sponge 12a thoroughly with a liquid composition 12b which is tacky, adhesive and pressure sensitive after vulcanizing. I then assemble the parts 12, 15 and 16 according to the steps of my method which will be described.

One example of a liquid impregnating composition which may be used satisfactorily in making my self-sealing tube comprises a blend of a hydrogenated resin, a liquid resin and neoprene. I first make separately a resin phase and an aqueous phase which I then mix together and then I blend the mixture with the neoprene which is a synthetic rubber made by polymerization of chloroprene. To make the resin phase I may dissolve 32 parts of Staybellite ester No. 10, which is a hydrogenated resin, and 8 parts of Hercolyn which is a liquid resin consisting chiefly of dihydromethyl abietate, in 10 parts of xylene or xylol, or alternatively in 10 parts of a light petroleum distillate, of which the commercial product known as "Solvesso No. 1 or No. 2" is an example. I may then add .65 part of oleic acid to this solution.

To make the aqueous phase I may dissolve .15 part of potassium hydroxide in 6 parts of primary water.

I then stir this aqueous phase into the resin phase by agitation until the product is smooth and creamy. This resulting dispersion can now be stored until needed at which time it is diluted with 43.20 parts of secondary water. The diluted emulsion is stirred and blended with the neoprene. The resin emulsion must be added to the neoprene slowly and with continuous stirring.

The proportions, in each instance by weight, are based upon the solid content of the Staybellite ester No. 10 and of the neoprene, and not upon the total weights of the emulsions as ordinarily purchased.

Figure 5:
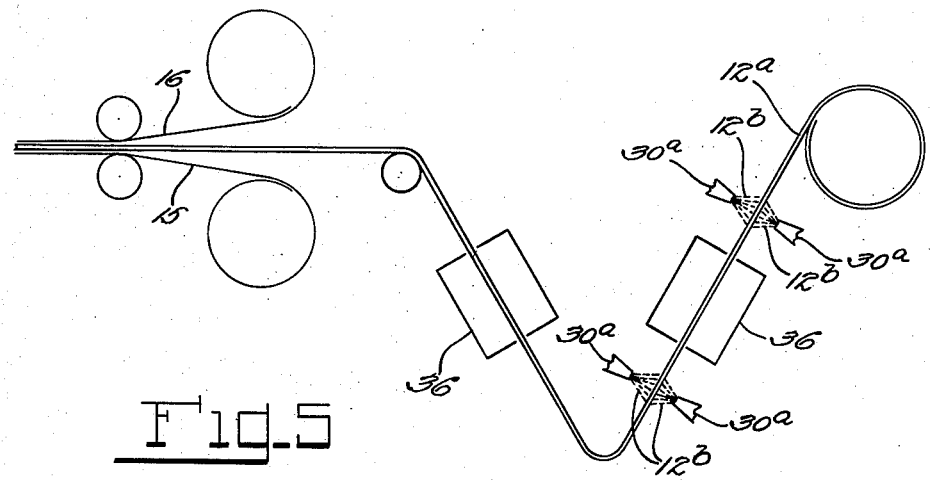
Fig. 5 is a view illustrating an alternative method of making the tube.

Two examples of the preparation and assembly of the parts of the tube according to my method are illustrated in Figs. 4 and 5. A supply of the rubber sponge 12a is provided by a roll 30 from which it passes into an impregnation vat 32 containing the impregnating liquid 12b, and then subjected to a drying operation. The now impregnated self-sealing member 12 is passed between supply rolls of the tube stock 15 and covering stock 16, respectively. The three parts 12, 15 and 16 may then be laminated together in any suitable manner, for instance, by passing them between pressure rolls 35. The laminated parts 12, 15 and 16 may then be passed through any suitable form of dryer 36 or the drying operation may preferably take place prior to the laminating operation, after which the lamination is cut in the desired lengths and formed in the usual manner in a vulcanizing mold at which time the edge flaps 20 and the covering piece 16 are joined to the tube stock 15 to secure the self-sealing member 12, and the tube is now complete as shown in Fig. 3.

An alternative method of preparing the self-sealing member 12 is illustrated in Fig. 5 in which the sponge member 12a is successively passed between sprayers 30a which spray on the impregnating liquid 12b, and suitable dryers 36, before it is passed between the tube stock 15 and the covering stock 16 and a final drying operation if desired. Furthermore, it may be desirable to form the self-sealing element 12 by impregnating drying and laminating two or more layers of the rubber sponge stock 12a between the tube stock 15 and the covering stock. The latter alternative step has advantages in forming thicker and heavier tubes used in heavy vehicles such as trucks in which a thicker sponge or two or more layers 12a may be used, the latter to insure thorough impregnation of the self-sealing element 12. Also there appears to be some advantage in impregnating the sponge 12a with successive coats of liquid 12b and alternately subjecting the member 12 to drying steps.

It appears that when the sponge 12a is first impregnated with the liquid 12b, the cells of the sponge are completely filled. However, during drying, the liquid 12b contracts and adheres to the inner surfaces of the sponge 12a and cell spaces are again formed in the member 12. The cellular structure also has much better self-sealing characteristics than a solid form, particularly when a foreign body such as a nail which has punctured the tube is later withdrawn. If the object is metal, such as a nail, and begins to rust, the structure still maintains a tight seal and does not tend to break down around the object.

Due to the novel construction of the tube, the sponge saturated with the self-sealing composition is always confined within the walls of the tube material so that the tube walls do not tend to stick together and render the tube useless after it is once deflated, and the composition being confined and dried to the sponge does not tend to run or become distorted.

Another advantage is economy of manufacture. The tube can be made with standard inner tube manufacturing equipment and it is easy to adapt to standard tube making practice. The ingredients of the composition are inexpensive, because a limited quantity of the composition is required since the sponge makes a good filler and takes up most of the space. My tube requires little additional labor to assemble. The manufacturing process is quick and short, particularly when drying of the composition is speeded up by artificial means. Another advantage is light weight compared to other self-sealing tubes. The sponge itself is very light and with less than the usual bulk in the self-sealing tread, the tube stands up better under conditions of extreme temperature and hard use. High temperature does not substantially soften the self-sealing structure to make it less effective, and in extreme cold it maintains its pliability and does not become brittle and cracked. The cushion effect of the sponge serves as a shock absorber giving the tube longer life and longer wearing quality.

Because the tube is extremely light in weight and flexible, it is easy and convenient to handle and to ship in compact form at a resulting low cost.

The self-sealing element is flexible and tends to yield to the movement of any foreign body in the tube and retain its sealing properties at the same time. Because of the reinforcing properties of the sponge rubber, the element retains its predetermined shape and position in the tube without sacrificing these flexible qualities.

I claim:

1. A self-sealing pneumatic inner tube for tires comprising an outer tubular wall forming a body for confining air under pressure, an inside covering piece secured to said wall forming therewith an inner casing in said body and a rubber sponge element in said inner casing, said rubber sponge element being impregnated with an adhesive composition which remains tacky and pressure-sensitive when the tube is vulcanized, the interior surfaces of the cells of said sponge element being coated with said adhesive composition throughout a substantial portion of said sponge element.

2. In a pneumatic inner tube for tires in combination with an outer tubular wall forming a body for confining air under pressure and an inner casing in said body formed by said outer wall and an inside covering piece secured to said wall, a self-sealing element in said inner casing comprising rubber sponge and a composition which remains tacky and pressure-sensitive after it is vulcanized, said rubber sponge being impregnated with said composition, the interior surfaces of the cells of said sponge element being coated with said adhesive composition throughout a substantial portion of said sponge element.

3. A self-sealing pneumatic inner tube for tires comprising an outer tubular wall forming a body for confining air under pressure, an inside covering piece secured to said wall forming therewith an inner casing in said body and a rubber sponge element in said inner casing, said rubber sponge element being impregnated with a composition comprising neoprene and a resin consisting chiefly of di-hydromethyl abietate, a solvent, oleic acid, potassium hydroxide and water, the interior surfaces of the cells of said sponge element being coated with said adhesive composition throughout a substantial portion of said sponge element.

MICHAEL R. PLACENTINO.

REFERENCES CITED

The following references are of record in the file of this patent:

UNITED STATES PATENTS

| Number | Name | Date |
| --- | --- | --- |
| 642,838 | Cochrane | Feb. 6, 1900 |
| 1,217,888 | Wildman et al. | Feb. 27, 1917 |
| 1,244,236 | Oberfelder | Oct. 23, 1917 |
| 1,257,780 | Armstrong | Feb. 26, 1918 |
| 1,808,091 | Waber | June 2, 1931 |
| 1,977,281 | Knowlton | Oct. 16, 1934 |
| 2,099,514 | Eberhard | Nov. 16, 1937 |
| 2,237,245 | Wilson et al. | Apr. 1, 1941 |

FOREIGN PATENTS

| Number | Country | Date |
| --- | --- | --- |
| 439,869 | Great Britain | Sept. 12, 1934 |
| 761,640 | France | Jan. 10, 1934 |